United States Patent

[11] 3,539,154

[72] Inventor Robert R. Goins
Bartlesville, Oklahoma
[21] Appl. No. 781,192
[22] Filed Dec. 4, 1968
[45] Patented Nov. 10, 1970
[73] Assignee Phillips Petroleum Company
a corporation of Delaware

[54] BLENDING APPARATUS
6 Claims, 3 Drawing Figs.
[52] U.S. Cl................................................ 259/4, 259/95
[51] Int. Cl................................................ B01f 15/02
[50] Field of Search.......................................... 259/4, 95, 36, 60

[56] References Cited
UNITED STATES PATENTS
3,138,369  6/1964  Bennett........................ 259/95
3,167,306  1/1965  Clark........................... 259/4
3,275,303  9/1966  Goins........................... 259/95
3,317,191  5/1967  Brown.......................... 259/4

Primary Examiner—Robert W. Jenkins
Attorney—Young and Quigg

ABSTRACT: Blending apparatus is formed by an upright chamber having an inlet in the upper region and a plurality of outlets in the bottom. A plurality of elongated tubes extend in a generally vertical direction inside the chamber, with the lower ends of the tubes extending through respective outlets. Deflecting means are positioned in the bottom of the chamber to form a plurality of channels to direct material to be blended downwardly toward the tubes. The tubes are provided with openings adjacent the outlets to receive material flowing through the channels and to convey such material out of the chamber.

Patented Nov. 10, 1970

3,539,154

INVENTOR.
R. R. GOINS

BY Young & Quigg

ATTORNEYS

BLENDING APPARATUS

In various industrial operations, it is desirable to mix solid particulate materials to obtain uniform blends. For example, it is common in the plastics industry to produce polymers in the form of relatively small pellets and to blend these pellets from different production runs in order to be assured of a uniform product. It has recently been discovered that particulate materials of this type can be blended quite effectively by the use of blending tanks which have a plurality of gravity flow tubes positioned therein. The tubes are provided with a plurality of openings to receive particulate material disposed in the blending chamber and to convey the material to a common collection chamber. A number of devices of this general type have become known in the art, as exemplified by U.S. Pat. Nos. 3,138,369; 3,216,629; and 3,275,303.

The present invention is directed toward providing improved apparatus of the general type described in the above-mentioned patents. In accordance with this invention, the bottom region of the blending tank is provided with a plurality of deflecting means to direct particles downwardly toward the flow tubes which extend through the bottom of the vessel. The flow tubes are provided with one or more openings adjacent the outlets of the vessel to receive the downwardly flowing material. This assures a positive drain of all particles from the bottom of the blending vessel, thereby eliminating the possibility of particles accumulating in recesses in the lower region of the vessel.

Accordingly, it is the object of this invention to provide improved apparatus for use in blending materials.

The accompanying drawing illustrates a specific embodiment of the apparatus of this invention.

Figures 1, 3:
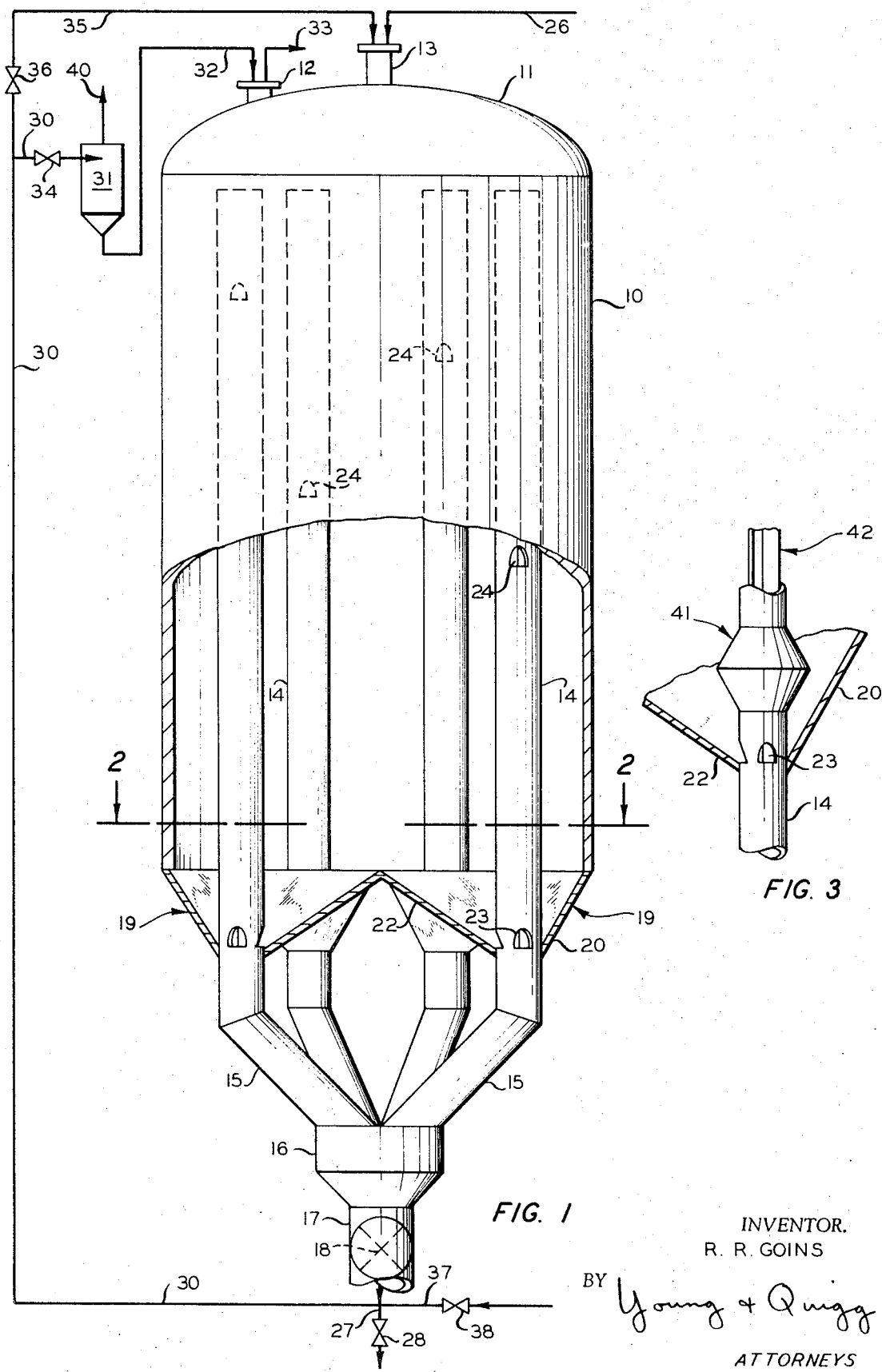
FIG. 1 is an elevation view, shown partially in section, of the blending apparatus.
FIG. 3 illustrates a modification of the apparatus of FIG. 1 in which a flow diverter is secured to one of the flow tubes.

Referring now to the drawing in detail, there is shown an upright blending vessel 10 which is provided with a top closure member 11. Closure member 11 is provided with one or more access openings, such as 12 and 13, through which materials to be blended can be introduced. A plurality of hollow tubes 14 are positioned within vessel 10 so as to extend generally parallel to the vertical axis of the vessel. The lower ends of these tubes extend through openings in the bottom of vessel 10 and are connected to tubes 15 which communicate with a collection vessel 16. An outlet conduit 17 extends from vessel 16, and is provided with a star valve or other flow control means 18.

Figure 2:
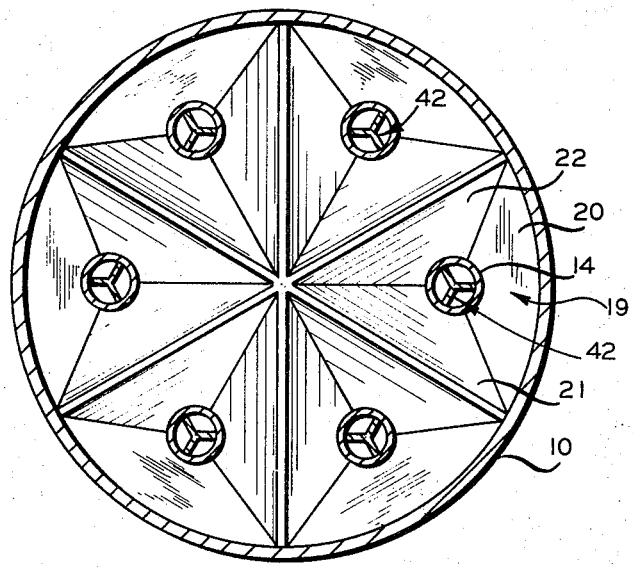
FIG. 2 is a view along line 2-2 in FIG. 1.

In accordance with this invention, a plurality of deflecting means 19 are provided in the lower region of vessel 10. As illustrated, six such deflecting means are provided, one for each of the flow tubes. Each deflecting means is formed by three generally triangular shaped plates 20, 21 and 22. As illustrated in FIG. 2, the upper edge of plate 20 is secured to the lower end of vessel 10. Plates 21 and 22 are secured to one another and to plate 20. The lower edges of the three plates contact tube 14, thereby providing an outlet opening through which the tube extends. Although generally flat plates are normally preferred in order to simplify construction, it is possible to construct the deflecting means so as to provide a generally conical configuration. All that is required is that wells or channels be provided to direct the particles of material to be blended downwardly and inwardly to flow tubes 14. In the illustrated embodiment, deflecting means 19 actually constitutes the bottom of vessel 10. In some constructions, these deflecting means can form a false bottom if vessel 10 is provided with a conventional bottom. As illustrated in FIG. 1, each of the tubes 14 is provided with one or more openings 23 adjacent the bottom openings in vessel 10. These openings permit material within vessel 10 to enter the tubes and be removed from the bottom of the vessel. It is important that openings 23 be of such size and shape that there is no hold-up of particles in the bottom of vessel 10. In general, a plurality of openings 23 are formed in each tube and cover substantially all of the circumference of each tube at the bottom region.

In addition to the openings 23 which are located adjacent the bottom of vessel 10, each of the tubes 14 is provided with one or more additional openings 24 which are located at spaced intervals through vessel 10. Openings 24 permit the material being blended to enter the tubes at various elevations, which greatly facilitates uniform mixing. Openings 24 can be of various configurations, several examples of which are shown in the patents mentioned above. The spacings of these openings can be varied in any desired manner to provide uniform mixing of the material to be blended.

The material to be blended is introduced into vessel 10 through one or both of the openings 12 and 13. For example, a conduit 26 communicates with opening 13 to provide for the introduction of the material from a source, not shown. The particles to be blended flow into vessel 10 and are withdrawn through tubes 14 when valve 18 is opened. This withdrawal can take place during the time that particles are introduced into the vessel, or can take place after vessel 10 is filled or partially filled with a charge of particles. In some operations, a single pass through the mixing vessel is all that is required to provide the desired degree of mixing. In this situation, the blended pellets are withdrawn through an outlet conduit 27 by opening valve 28 therein.

In other operations, it is desirable to recirculate the pellets through the blender one or more times. This can be accomplished by means of a conduit 30 which extends from conduit 17 to the inlet of a cyclone separator 31. The bottom outlet of separator 31 is connected by a conduit 32 to opening 12. The bottom outlet of separator 31 is, of course, physically positioned above opening 12 in actual practice so that the particles move by gravity from separator 31 to opening 12. A vent conduit 33 also communicates with opening 12. Conduit 30 is provided with a valve 34 to control the flow to separator 31. A bypass conduit 35, which has a valve 36 therein, extends from conduit 30 to opening 13. Valves 34 and 36 can be replaced by a conventional diverter valve so that the flow path can be controlled by a single valve. A conduit 37, which has a valve 38 therein, extends from conduit 30 to a source of pneumatic pressure, not shown. When valve 38 is opened, the pneumatic pressure carries pellets from conduit 17 through conduit 30 to separator 31 and to opening 12 or 13, depending on the positions of valves 34 and 36. In either event, the pellets are returned to the top of vessel 10. If the flow is through separator 31, the transporting gas is removed and withdrawn through an outlet conduit 40. If the flow is directed to opening 13, the transporting gas is removed from the system through conduit 33. The pellets can be recirculated through the vessel 10 as many times as is required to provide a uniform blend.

In the blending of certain types of materials, a more uniform blend can be obtained by the addition of baffle means 41 to tubes 14 above openings 23, as illustrated in FIG. 3. This baffle means can advantageously be in the form of two conical sections which are secured to the tube in the manner illustrated and which serve to divert the flow of particles downwardly toward the deflecting means provided by plates 20, 21 and 22.

Tubes 14 can be provided with one central longitudinal passage or with a plurality of such passages. The latter can be accomplished by inserting a baffle 42 in the tubes, as shown in FIGS. 2 and 3. This baffle can divide the tube into two or more passages, thereby effectively increasing the number of tubes in vessel 10. Openings 24 can be at the same or different levels with respect to the plurality of passages in each tube. In general, there should be as many openings 23 in each tube as there are passages within the tube to assure uniform draining from each of the deflecting means 19.

While this invention has been described in conjunction with presently preferred embodiments, it obviously is not limited thereto.

I claim:

1. Blending apparatus comprising:
   a chamber having at least one opening in the top portion thereof and a plurality of openings in the bottom, the latter being spaced from one another;

a plurality of elongated tubes positioned within said chamber so as to extend generally parallel to the vertical axis of the chamber, the lower end of each of said tubes extending through a respective one of the openings in the bottom of said chamber, each of said tubes having at least one opening in the side thereof at a location above and closely spaced to the opening in the bottom of the chamber through which the tube extends; and a plurality of deflecting means in the bottom of said chamber, each of said deflecting means having walls which engage a respective tube at a region below and closely spaced to said at least one opening in the tube and which extend upwardly and outwardly therefrom so as to provide a channel receive material to be blended which is positioned within said chamber and to direct such material downwardly toward the tube and into said at least one opening in the tube.

2. The apparatus of claim 1 wherein each of said deflecting means comprises three generally triangularly shaped plates.

3. The apparatus of claim 1 wherein at least one of said tubes contains a baffle which extends longitudinally of the tube so as to divide the tube into a plurality of passages which extend longitudinally of the tube, said tube being provided with a plurality of said openings so that at least one of said openings communicates with each of said passages.

4. The apparatus of claim 1, further comprising a collecting means, means connecting the lower ends of said tubes with said collecting means, and conveying means extending from said collecting means to said opening in the top portion of said chamber to permit material to be blended to be passed from said collecting means into said chamber.

5. The apparatus of claim 1, further comprising baffle means secured to each of said tubes adjacent said deflecting means so as to divert particles flowing downwardly through said chamber adjacent the tubes outwardly away from the tubes toward the walls of said deflecting means.

6. The apparatus of claim 5 wherein each of said baffle means comprises two frustoconically shaped members surrounding said tubes with the bases thereof joined together.

UNITED STATES PATENT OFFICE

CERTIFICATE OF CORRECTION

Patent No. 3,539,154        Robert R. Goins        Dated Nov.

It is certified that error appears in the above-identified patent and that Letters Patent are hereby corrected as shown below:

Column 3, line 14, "to" has been omitted after "channel".

SIGNED AND SEALED

MAR 2 1971

(SEAL)
Attest:

Edward M. Fletcher, Jr.
Attesting Officer

WILLIAM E. SCHUYLER
Commissioner of Pa